Figure 1:
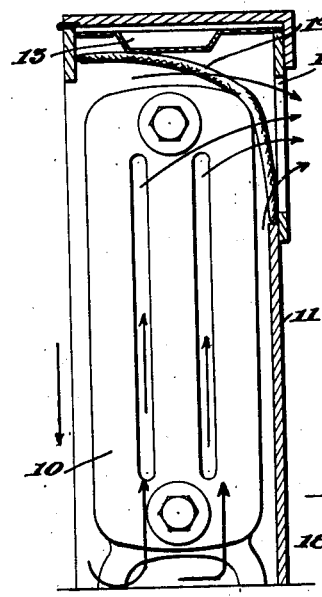

Aug. 30, 1932.  W. J. BACON  1,874,734
FILTER PAD
Filed April 4, 1929

Inventor:
William J. Bacon,
John W Farley
Att'y.

Patented Aug. 30, 1932

1,874,734

UNITED STATES PATENT OFFICE

WILLIAM J. BACON, OF MEMPHIS, TENNESSEE, ASSIGNOR TO MYRTLE M. BACON, OF MEMPHIS, TENNESSEE

FILTER PAD

Application filed April 4, 1929. Serial No. 352,379.

My said invention relates to a filter pad, the objects of the invention and the advantages flowing therefrom being hereinafter more fully set forth. Various devices for obtaining the results of my invention have heretofore been proposed, particularly in connection with means for filtering air and gas but such devices have been open to serious objection. Commonly the filtering material has been loosely packed into some kind of container and has shown tendency to sag toward the bottom, it being also frequently distributed irregularly in the container or showing a tendency to become irregular in distribution. Attempts have been made to cure this defect by placing small quantities of filtering material in a considerable number of separate cells and stacking the cells, but this gives rise to considerable expense in the preparation of the cells and is inconvenient both in installation and in replenishment or cleansing.

Figure 2:
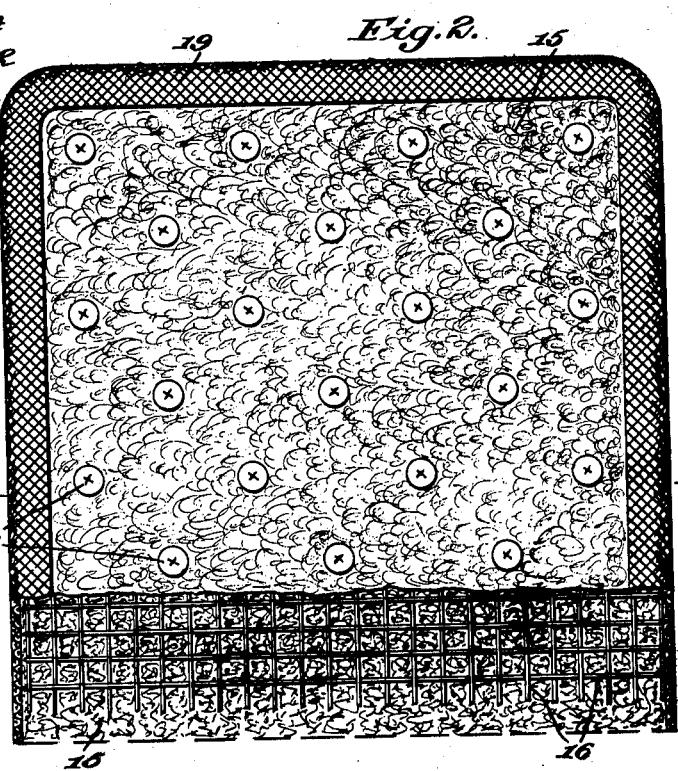
Figure 3:
Figure 4:

In the drawing, which is made a part of this application and in which similar reference characters indicate similar parts:

Fig. 1 is an end view of a radiator and an enclosure therefor, partly in section, showing my device applied thereto and illustrating one way in which the device may be used, Fig. 2, a plan of a portion of a pad, with parts broken away to illustrate the internal construction, Fig. 3, a transverse section of the device, and Fig. 4, a similar section of a modified form.

In the drawing reference character 10 indicates a radiator of any conventional or desirable character, provided with an enclosure 11, such enclosures being well known and occurring in many forms. The enclosure has an opening 12 at the front side through which the heated air passes into the room, the cold air entering at the bottom and at the rear of the closure, and it is provided at the upper end with a container 13 for holding water to increase the humidity of the air in the room.

The parts so far mentioned are conventional, my invention consisting in a pad such as is illustrated at 14 in Fig. 1, which pad is of such a nature that it may be easily bent into any shape that may be desirable and will then retain such shape, a function of the pad being to cleanse the air passing through the radiator enclosure, of any impurities that may be in the air, such as dust, motes, particles of grease, etc.

A detail of the device is shown in Fig. 2, where the filtering material is illustrated at 15. Such material may consist of steel wool or other suitable fibres or other material. The pad has a core 16, herein illustrated as consisting of woven wire, but which may be made of any suitable material that is flexible and will sustain the form of the pad. Obviously for some purposes it would not even need to be flexible. As a convenience in making the pad the filtering material will usually be applied in two layers to opposite sides of the core, though this may be varied. As here illustrated the filtering material is held in place by stitching 17, the stitches passing through and being supported by rosettes 18 of familiar type.

The filter can be cut as required without disturbing the stitching and without permitting it to fall apart, or the filter substance to become detached from the flexible core. This stitching further prevents the disarranging of the filtering pads; prevents them from sagging or becoming thicker or thinner in one place than another, whether the filter is employed in a horizontal, perpendicular or other manner.

My device can be used in connection with ventilating systems to purify the air; as a cover for recently painted objects to prevent particles of dirt and the like from settling upon them; in the ventilators and windows of Pullman cars and railway coaches to prevent cinders, dust, etc., from blowing into the cars; and, in connection with heating units, to extract from the air, particles of dirt or dust put in motion by the moving air currents in the process of heating. It can be used in bedroom, school and hospital windows, that are opened for the purpose of ventilation, to prevent impurities from the outer air entering the building or room. It can be used in connection with an electric fan for purifying the air in the room and extracting from the air, disease germs and the small particles or motes of matter that can be seen dancing in a shaft of sun light entering a room.

Preferably the pad is provided with packing material about the outer edges. One form of packing material which may also serve as a binder is illustrated at 19. It will be understood that such packing may consist of a flexible member such as cloth which can be stitched or otherwise applied to the edges of the pad. The packing may aid in holding the filtering material in place but its principal function is to make a tight joint between the pad and the sides of an opening such as a window, thereby to prevent air from passing about the pad without passing through the filtering material, which would reduce the efficiency of the pad by permitting dust and other impurities to remain in the atmosphere. A rope or roll of steel wool or other material or a strip of asbestos cloth would obviously serve the purpose of the packing according to the use which is to be made of the pad. In connection with a radiator such as shown in Fig. 1 the packing is quite essential so as to make a tight joint between the pad and the walls of the radiator cover or enclosure.

My device can be used singly or in series, and can readily be installed in air-vent ducts and intake pipes in ventilating systems that are now in use in hotels, theatres, hospitals, etc. It can readily be used in connection with a cook stove to catch the particles of grease, carbon, etc., that are given off by the stove in the process of cooking and that adhere to the stove pipe, walls and ceiling about stoves in kitchens. It can be used in this manner by the employment of the movement caused by the air currents from the hot stove or with an electric fan in connection to accelerate the movements of the air current and force them thru the filter pads.

Another advantage of my device is, that it can be bent to any shape and employed in any opening, whether the opening be round, square or irregular; that it can be cut to any size; will be light and inexpensive; can be readily removed for cleaning or renewal; can be used as one piece or in many pieces, overlapping at the edges, making for ease in installation and in removing for cleansing as well as avoiding waste as small remnants, or cut off ends can be saved and so employed.

It is desirable for some purposes to use a pad having fine steel wool or like material at one side as indicated at 20 in Fig. 4 and coarser filtering material at the other side as indicated at 21 in said figure. In other respects the modified form of Fig. 4 may be the same as in other figures.

It will be obvious to those skilled in the art that various modifications may be made in my device without departing from the spirit of my invention and therefore I do not limit myself to what is shown in the drawing and described in the specification but only as indicated in the appended claim.

Having thus fully described my said invention, what I claim as new and desire to secure by Letters Patent is:

A filter pad comprising filtering material, a flat flexible form-sustaining core embedded therein, and packing material about the edges of the pad.

In testimony whereof I affix my signature.

WILLIAM J. BACON.